United States Patent [19]

Griffiths et al.

[11] Patent Number: 4,915,849

[45] Date of Patent: Apr. 10, 1990

[54] PROCESS FOR THE TREATMENT OF EFFLUENTS CONTAINING CYANIDE AND OTHER OXIDIZABLE SUBSTANCES

[75] Inventors: Andrew Griffiths, Ridgewood; M. Quamrul Ahsan, Waldwick, both of N.J.; Roy Norcross, Norwalk, Conn.; Helmut Knorre, Seligenstadt; Friedrich W. Merz, Nierstein, both of Fed. Rep. of Germany

[73] Assignee: Degussa Aktiegesellschaft, Frankfurt, Fed. Rep. of Germany

[21] Appl. No.: 233,165

[22] Filed: Aug. 17, 1988

[51] Int. Cl.$^4$ .............................................. C02F 1/58
[52] U.S. Cl. ..................................... 210/759; 210/904
[58] Field of Search ........................ 210/759, 904, 743

[56] References Cited

U.S. PATENT DOCUMENTS

| | | | |
|---|---|---|---|
| 3,900,555 | 8/1975 | Jordan-Laforte | 210/759 X |
| 4,246,104 | 1/1981 | Schmidt et al. | 210/759 |
| 4,416,786 | 11/1983 | Knorre et al. | 210/904 X |
| 4,512,900 | 4/1985 | Macur et al. | 210/904 X |

Primary Examiner—Tom Wyse
Attorney, Agent, or Firm—Beveridge, DeGrandi & Weilacher

[57] ABSTRACT

Treatment of effluent containing cayanide is disclosed wherein a mixture of $H_2SO_4$ and $H_2O_2$ with between 0.01 and 0.5 moles of $H_2SO_4$ per mole of $H_2O_2$ is used.

10 Claims, 2 Drawing Sheets

EFFECT OF THE VARIATION OF MOLAR RATIO OF SULFURIC ACID TO HYDROGEN PEROXIDE ON THE EFFICIENCY OF DETOXIFICATION SHOWN AS CONSUMPTION OF HYDROGEN PEROXIDE (IN MOLES) PER MOLE OF CYANIDE (CN) IN THE WASTEWATER

FIG.1 EFFECT OF THE VARIATION OF MOLAR RATIO OF SULFURIC ACID TO HYDROGEN PEROXIDE ON THE EFFICIENCY OF DETOXIFICATION SHOWN AS CONSUMPTION OF HYDROGEN PEROXIDE (IN MOLES) PER MOLE OF CYANIDE (CN) IN THE WASTEWATER

PROCESS FOR THE TREATMENT OF EFFLUENTS CONTAINING CYANIDE AND OTHER OXIDIZABLE SUBSTANCES

BACKGROUND OF THE INVENTION

The present invention relates to a process for the detoxification of effluents containing cyanide and/or other oxidizable substances, utilizing hydrogen peroxide and sulfuric acid.

Purification of waste water and recovery of components thereof is of major importance in connection with protection of the environment. Effluents from a variety of industrial processes often contain cyanide in various forms such as simple or complex cyanide together with toxic metals. The recovery of such substances and the removal thereof from effluent is of paramount importance before such waste waters are discharged in order to avoid serious damage to the environment and adverse impact on public health and safety.

A number of methods have been developed over the years for the treatment of such effluents. One of the best among the known methods for treating effluents containing cyanide and heavy metals such as copper, zinc and nickel involves the oxidation of the cyanide contained in the waste water with hydrogen peroxide. Heavy metals contained in such waste effluents are usually removed by precipitation as a part of the overall process. These methods have been used successfully on a commercial scale for a number of years and are known to have a number of advantages over the even older methods such as treatment with chlorine because the excess hydrogen peroxide that is utilized decomposes to give only water and oxygen. In the older methods involving chlorine, undesirable salts are formed and introduced into the waste water. The utilization of hydrogen peroxide overcomes the disadvantages associated with methods which involve salt formation and the introduction of those salts into waste water.

In the case of effluents arising from ore-processing plants, the waste effluent often takes the form of so-called tailings pulp, or slurry, wherein the proportion of solids may be 50% or even higher. Hydrogen peroxide has been successfully used to treat such pulps and has been demonstrated on a commercial scale. In such operations, it has been found that the processing of some types of ore leads to tailings pulps which require relatively large amounts of hydrogen peroxide for treatment. In such cases, the economic viability of the detoxification process depends on reducing the consumption of effluent treatment chemicals as far as possible.

One method for reducing the consumption of hydrogen peroxide by accurate measurement of the oxidizing agent demand and control of the dosage thereof is shown in U.S. Pat. No. 4,416,786, assigned to the same assignee as the present application and which is relied on and incorporated herein by reference. This method has been shown to be successful in preventing unnecessary excess dosage of the hydrogen peroxide. It has also been found to be suitable for adapting the dosage to changes in concentrations of cyanide and other oxidizable substances in the effluent.

A further method for reducing the consumption of hydrogen peroxide, which is the subject of a patent application by the same assignee as the present application and which is relied on and incorporated herein by reference, involves the removal of magnetic material before treatment of the pulp, since magnetic components have been found to cause catalytic decomposition of the $H_2O_2$ and a corresponding increase in consumption.

However, in some cases the consumption of hydrogen peroxide is still high, and further reduction in the consumption of hydrogen peroxide and consequently a reduction in the cost of waste water treatment is a worthwhile objective.

One procedure has been described in U.S. Pat. No. 3,900,555, which relies on the preparation of monoperoxysulfuric acid (also known as Caro's acid) using an apparatus described in U.S. Pat. No. 3,939,072, and subsequently adding the monoperoxysulfuric acid to the waste water, while simultaneously adding an alkali to the waste water in an amount suitable for neutralizing the acid. Although monoperoxysulfuric acid is an excellent oxidizing agent for the treatment of polluted water, the process described in U.S. Pat. No. 3,900,555, using the apparatus described in U.S. Pat. No. 3,939,072, suffers from the considerable disadvantage that the vessel in which the monoperoxysulfuric acid is prepared has to be cooled by passing a coolant through a water jacket in order to prevent overheating of the reactants and premature decomposition of the monoperoxysulfuric acid. A further disadvantage of the known process is that the formation of monoperoxysulfuric acid is a slow process, taking from 20 minutes to 3 hours to reach the equilibrium concentration of monoperoxysulfuric acid. The reaction mixture must be cooled the whole time to achieve good conversion of the reagents into monoperoxysulfuric acid.

The known reaction between sulfuric acid and hydrogen peroxide to form monoperoxysulfuric acid is generally depicted as follows:

$$H_2SO_4 + H_2O_2 \rightleftharpoons H_2SO_5 + H_2O$$

Theoretically, one mole of sulfuric acid reacts with one mole of hydrogen peroxide to yield one mole of monoperoxysulfuric acid. In practice, excess sulfuric acid is added, in order to maximize the amount of monoperoxysulfuric acid present in the equilibrium mixture.

Thus, for example, U.S. Pat. No. 3,900,555 describes the use of 150 ml/hour of sulfuric acid (66° Be, or 96% $H_2SO_4$ by weight) and 54 ml/hour of hydrogen peroxide (70% $H_2O_2$ by weight) to produce 1 mole/hour of monoperoxysulfuric acid in the form of a 31% solution by weight. The mole ratio used in this example can be easily calculated, using the specific gravities of 96% $H_2SO_4$ (1.8355) and 70% $H_2O_2$ (1.288) and the molecular weights of $H_2SO_4$ (98) and $H_2O_2$ (34):

$$\text{Mole ratio } H_2SO_4 : H_2O_2 = \frac{150}{54} \times \frac{1.8355}{1.288} \times \frac{34}{98} \times \frac{96}{70}$$

$$= 1.88 : 1$$

U.S. Pat. No. 3,900,555 describes further the consumption of 608 g of 92% sulfuric acid and 164 g of 70% hydrogen peroxide, which is equivalent to a molar ratio for $H_2SO_4:H_2O_2$ of 1.69:1.

Further information on the optimum mole ratio of $H_2SO_4$ to $H_2O_2$ for the conversion into monoperoxysulfuric acid is contained in British Patent No. 797,701, which teaches that the best mole ratio is 1.4:1, giving 94% conversion, and that if this ratio is reduced to 1.2:1 the yield is reduced to 89%, and that further reduction of the mole ratio to 1:1 results in conversion of only .63 or 75%, depending on the concentration of the reacting solutions.

The large excess of sulfuric acid employed in this process results in high cost, not only for the sulfuric acid itself, but also for the alkali needed to neutralize it in the detoxification process.

SUMMARY OF THE INVENTION

It is an object of the present invention to avoid these disadvantages and provide a more practicable and cost-effective process for the efficient treatment of effluents, using hydrogen peroxide and sulfuric acid.

As is known in the art, reduction of the molar ratio $H_2SO_4 : H_2O_2$ by 15% or 30% below the optimum range for the preparation of monoperoxysulfuric acid results in poorer conversion of the reagents. It has also been found that such mixtures result in poorer detoxification performance, as would be expected on the basis of the known excellence of monoperoxysulfuric acid as an oxidizing agent. Surprisingly, it has now been found that reduction of the mole ratio to one-tenth or even less of the optimum figure results in an oxidizing mixture whose performance is significantly better than that obtained by mixtures with mole ratios of 0.5 and above, to 0.8:1.

Use of this newly-discovered operational range has several major advantages over the known method of effluent treatment with monoperoxysulfuric acid. These include lower cost for sulfuric acid, lower cost for the alkaline material needed to neutralize the acid during the detoxification process, and an enormously reduced requirement for cooling the reaction mixture.

Accordingly, the present invention pertains to a method for treating effluent, especially waste water containing cyanide by contacting said effluent with a mixture of hydrogen peroxide and sulfuric acid in a selected range of mole ratios. The mixture of hydrogen peroxide and sulfuric acid is to be used promptly after being mixed together.

BRIEF DESCRIPTION OF THE DRAWING

The invention will be further understood by reference to the drawings, wherein FIG. 1 relates to the efficiency of the oxidizing agent, expressed as the number of moles of $H_2O_2$ required to detoxify one mole of cyanide to give a residual concentration of cyanide of 0.5 parts per million or less, to the mole ratio of $H_2SO_4$ $H_2O_2$ in the oxidizing mixture.

DETAILED DESCRIPTION OF THE INVENTION

Figure 1:
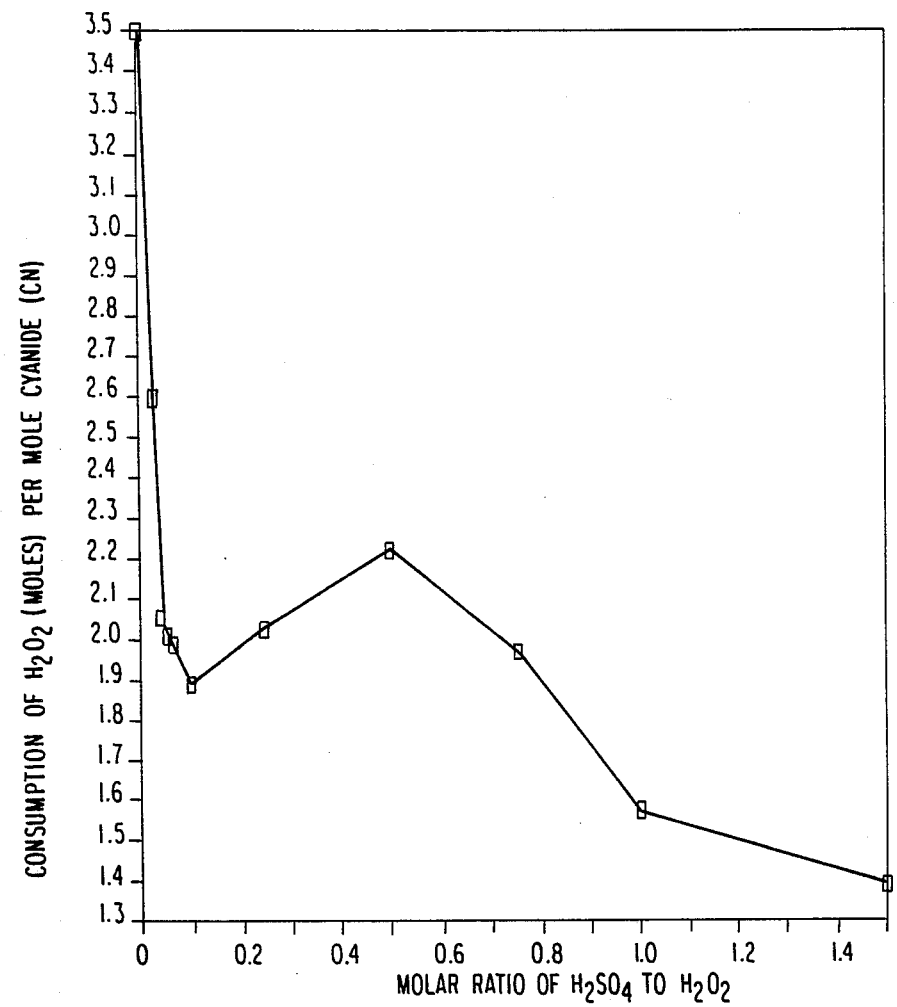
Figure 2:
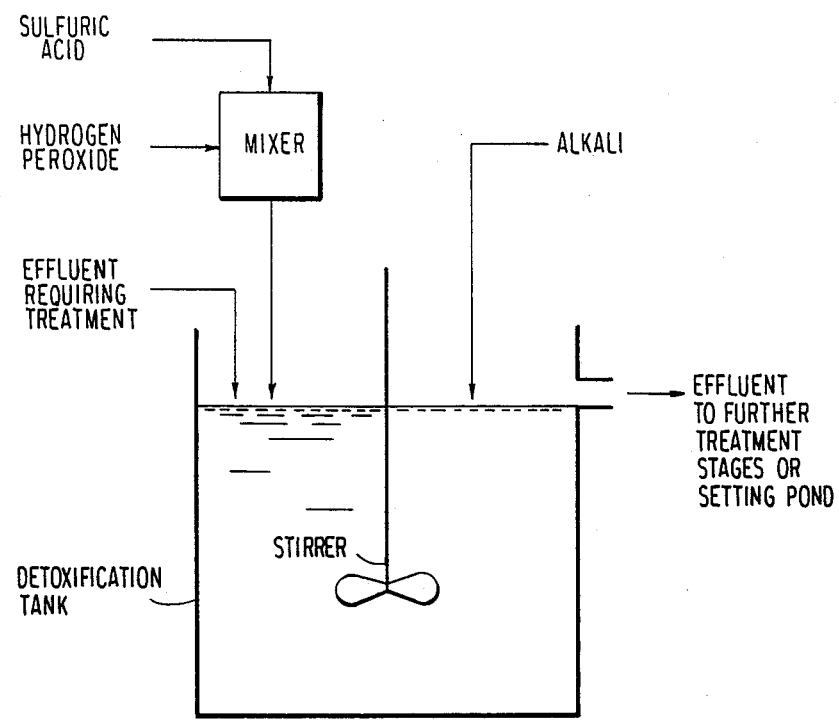
FIG. 2 is a flow sheet for the process of the present invention.

The present invention pertains to the preparation of a powerful oxidizing agent by mixing hydrogen peroxide, at a concentration of between 35% and 90%, preferably 70%, by weight and sulfuric acid at a concentration of between 50 and 99%, preferably between 90% and 98% by weight, in proportions that correspond to between 0.01 and 0.5 moles of sulfuric acid per mole of hydrogen peroxide, and preferably between 0.025 and 0.25 moles of sulfuric acid per mole of hydrogen peroxide, and includes but is not confined to the use of this mixture to oxidize contaminants in waste water.

In more detail the present invention enables the controlling of the content of oxidizable impurity in an aqueous medium, especially where the oxidizable impurity is cyanide in the form of a simple or complex cyanide anion.

One embodiment of the present invention is carried out with the following steps for the continuous treatment of waste water containing cyanide and other contaminants arising from an ore-processing operation:

1. The effluent from the ore-processing operation typically containing one or more heavy metals and cyanide, which may be a clear solution or a pulp, or slurry with up to 60% solid content, is allowed to flow through one or more detoxification tanks, each equipped with a propeller-type stirrer to agitate the effluent. The tanks are chosen in size and number to provide sufficient reaction time for the oxidation of the contaminants, which is typically between 5 minutes and 2 hours.

2. Aqueous hydrogen peroxide, at a concentration of about 35 to 90%, preferably 70% by weight, and sulfuric acid, at a concentration of about 50 to 99%, preferably 96% by weight, are mixed together before introduction to and contact with the waste effluent. This combination of reactants can be accomplished in a number of ways. For example, the hydrogen peroxide and sulfuric acid can be dosed in fixed proportions to a relatively small vessel located at a point near the surface of the effluent in the first detoxification tank. That is the small vessel can be positioned within the larger detoxification tank. The two liquids are mixed together, either using an inline, or static, mixer, or by using the small stirred vessel arranged so that the mixture overflows into the second and larger detoxification tank located in the immediate vicinity of the smaller mixing tank. A series of reaction vessels can be arranged in cascading relation with respect to the overflow from the detoxification tank for completion of the reaction. All vessels used in the process of the invention must be constructed of a material such as glass or stainless steel, which is resistant to the chemicals in use. Normally the mixing time is brief, i.e. from 1 to 60 minutes before the mixture is reacted with the effluent. In the course of mixing together hydrogen peroxide and sulfuric acid the reaction generates heat. It may in some cases be advantageous to position the mixing vessel so that it is cooled by the effluent in the detoxification tank.

The addition of hydrogen peroxide and sulfuric acid can be controlled manually, on the basis of regular analyses of residual cyanide in the effluent, using methods of analysis well known to those skilled in the art. Automatic control can be achieved using the process described in U.S. Pat. No. 4,416,786, whereby a continuous titration of a side-stream of the effluent with a strong oxidizing agent is used to determine the demand of oxidizing agent. In this case, the continuous titration gives the information required to dose the hydrogen peroxide, while the sulfuric acid dosing rate is maintained so as to give the required mole ratio to the hydrogen peroxide. The rate of addition of the hydrogen peroxide-sulfuric acid mixture is fixed by the ratio of components and is determined by the flow rate of effluent. If the temperature rises above about 40° to 50° then the flow rate of the effluent can be increased to cool the reaction to ambient or slightly higher. Some elevation of the temperature of the effluent is often desirable.

3. Lime slurry or sodium hydroxide solution is added to the effluent in order to maintain the pH between 9 and 12, preferably between 9.5 and 11.5. Any suitable alkaline material can be used for this purpose but lime is preferred because it assists in the precipitation, as is known in the art. The addition of alkaline material can be controlled automatically via pH electrode and control circuit, using methods known to those skilled in the art.

4. After the oxidation of cyanide and other oxidizable pollutants has been satisfactorily completed, further steps may be carried out in order to further purify the effluent. Such steps include, but are not limited to, the addition of copper (II) salts to precipitate ferrocyanide ions, or iron (III) salts to precipitate arsenic, or the modification of the pH by addition of acids or alkalis.

5. After treatment, the effluent containing the precipitated materials may be allowed to flow under gravity or may be pumped to a pond, in which the solids separate out. The supernatant water may be discharged to the environment or reclaimed for use in the ore-processing operation. The metal content of the precipitate, e.g., copper, could be recovered by known methods.

6. The reaction between the oxidizing agent and the cyanide may be accelerated by the addition of a catalyst, such a soluble copper (II) salt, especially copper (II) sulfate pentahydrate, in an amount which yields a concentration of dissolved copper in the effluent between 5 and 500 parts per million.

In another embodiment of the present invention the detoxification may be carried out on a batch basis. Such a method is suitable in cases where smaller quantities of cyanide containing effluent are produced as, for example, from steel-hardening shops or electroplating operations. In such cases, a detoxification tank ma be filled with effluent and agitated with a propeller-type stirrer. The same detoxification steps can be carried out as described previously. That is, the hydrogen peroxide and sulfuric acid are mixed together and promptly thereafter the resulting mixture is charged to the detoxification tank.

At the end of the treatment the effluent may be filtered to remove solids which may contain toxic substances such as heavy metal salts, and the liquid discharged to a sewer or to the environment. The filter cake may be disposed of in a suitable landfill.

The following examples from the field of effluent treatment are illustrative and are not intended to limit the invention.

EXAMPLES

Examples 1 through 11 describe tests that were performed on samples of simulated waste water obtained by adding 0.78 g of copper (II) sulphate pentahydrate to two liters of water containing 1.13 g of sodium cyanide. After addition of the copper sulfate, the water was found by analysis to contain 320 ppm cyanide (in mg CN/l) and 100 ppm copper (mg Cu/l). The oxidizing agent was prepared by mixing the appropriate quantity of 96% sulfuric acid with 70% hydrogen peroxide (both percentages by weight). Four minutes after mixing, measured volumes of oxidizing agent were added to the waste water sample which was at ambient temperature and the mixture stirred for 45 minutes. No cooling of the reaction mixture was carried out. The pH of the waste water was maintained at between 11 and 11.5 by controlled addition of 50% sodium hydroxide. At the end of the 45 minute reaction time, a sample was withdrawn from the waste water and analyzed for residual cyanide using the picric acid spectrophotometric method.

For each mole ratio ($H_2SO_4$: $H_2O_2$) tested, several experiments were performed using various amounts of oxidizing agents, in order to optimize the dosage required for detoxification of the waste water down to a residual cyanide concentration of 0.5 parts per million (0.5 mg CN/liter) or less.

Table 1 summarizes the optimized results obtained with mole ratios of $H_2SO_4$: $H_2O_2$ between 0 and 1.5.

The results are also displayed in the form of a graph in FIG. 1, which relates the molar ratio of $H_2SO_4$: $H_2O_2$ in the oxidizing mixture to the molar ratio of $H_2O_2$ : CN required to detoxify the waste water to give a residual cyanide concentration of 0.5 ppm or less.

FIG. 1 clearly shows that two ranges of effective operation exist: one at molar ratios ($H_2SO_4$ : $H_2O_2$) of greater than 0.5 and one at molar ratios between 0.025 and 0.5. The first range corresponds to the known process using monoperoxysulfuric acid, while the second range is the hitherto unknown range which is the subject of the present invention.

The optimum mole ratio of $H_2SO_4$ to $H_2O_2$ in these examples pursuant to the present invention is found to be close to 0.1:1. The amount of $H_2O_2$ required to detoxify the waste water was determined to be 1.89 moles per mole of cyanide oxidized, if used in this ratio with sulfuric acid; or 3.5 moles, if used without addition of sulfuric acid. The results of detoxification were very similar, as shown by the residual cyanide concentration of 0.45 and 0.50 ppm, respectively. Use of hydrogen peroxide and sulfuric acid in this example led, therefore, to a savings of 46% compared to the conventional process using $H_2O_2$ alone. The small quantities of $H_2SO_4$ and NaOH required in accordance with the invention do not significantly affect the economic gain achieved by using the process according to the present invention.

Comparing the process of the present invention with the process using monoperoxysulfuric acid, shown by Example 11, the amount of $H_2O_2$ required is somewhat less in Example 11 than in Example 6 (26.4% less) but the amounts of $H_2SO_4$ and NaOH required are very much higher (1003% and 1000% respectively). If the problem of heat generation is considered as well, the advantages of the process of the present invention become even more evident.

Table II shows the effect of storing the mixed oxidizing agent for periods between 1 minute and 72 hours before use.

It can be seen from Table II that the oxidizing agent is ready for use within one minute of mixing, and that no significant loss of oxidizing power is encountered up to 60 minutes after mixing. A storage period of three days is however, definitely detrimental to the efficacy of the oxidizing agent.

TABLE I

| EXAMPLES | MOLAR RATIO $H_2SO_4$:$H_2O_2$ | CONSUMPTION OF REAGENTS PER MOLE OF CYANIDE (CN) IN THE WASTE WATER | | | RESIDUAL CYANIDE (CN) CONCENTRATION (ppm) |
|---|---|---|---|---|---|
| | | Moles of $H_2O_2$ | Moles of $H_2SO_4$ | Moles of NaOH | |
| Example 1 | 0:1 | 3.500 | 0.000 | 0.000 | 0.50 |
| Example 2 | 0.025:1 | 2.593 | 0.065 | 0.170 | 0.48 |
| Example 3 | 0.036:1 | 2.057 | 0.074 | 0.190 | 0.50 |
| Example 4 | 0.050:1 | 2.015 | 0.101 | 0.250 | 0.48 |
| Example 5 | 0.063:1 | 1.990 | 0.125 | 0.350 | 0.50 |

TABLE I-continued

| EXAMPLES | MOLAR RATIO $H_2SO_4:H_2O_2$ | CONSUMPTION OF REAGENTS PER MOLE OF CYANIDE (CN) IN THE WASTE WATER | | | RESIDUAL CYANIDE (CN) CONCENTRATION (ppm) |
|---|---|---|---|---|---|
| | | Moles of $H_2O_2$ | Moles of $H_2SO_4$ | Moles of NaOH | |
| Example 6 | 0.100:1 | 1.890 | 0.189 | 0.490 | 0.45 |
| Example 7 | 0.250:1 | 2.020 | 0.505 | 1.310 | 0.42 |
| Example 8 | 0.500:1 | 2.220 | 1.110 | 2.900 | 0.40 |
| Example 9 | 0.750:1 | 1.970 | 1.478 | 3.800 | 0.50 |
| Example 10 | 1.000:1 | 1.570 | 1.570 | 4.100 | 0.30 |
| Example 11 | 1.500:1 | 1.390 | 2.085 | 5.400 | 0.40 |

TABLE II

| EXAMPLES | TIME OF STORAGE | CONSUMPTION OF HYDROGEN PEROXIDE PER MOLE OF CYANIDE (CN) IN THE WASTE WATER | RESIDUAL CYANIDE (CN) CONCENTRATION (ppm) |
|---|---|---|---|
| Example 6 | 4 min. | 1.89 moles | 0.45 |
| Example 12 | 1 min. | 1.89 moles | 0.47 |
| Example 13 | 10 min. | 1.89 moles | 0.50 |
| Example 14 | 20 min. | 1.89 moles | 0.50 |
| Example 15 | 60 min. | 1.89 moles | 0.48 |
| Example 16 | 72 hr. | 1.89 moles | 16.00 |

Table III summarized the results of removal of cyanide from actual mining effluents by the process described herein, using $H_2SO_4$ and 70% $H_2O_2$ in a molar ratio of 1 to 10, compared with 70% $H_2O_2$ alone. The same analytical procedure was used to measure cyanide concentration as in the previous examples.

TABLE III

| Examples | Sample | 70% $H_2O_2$ per kg Effluent | 98% $H_2SO_4$ per kg of Effluent | Cyanide (CN) Concentration (ppm) |
|---|---|---|---|---|
| Example 17 | Effluent from a gold mine in Canada | 25.0 ml | 0.0 ml | 19.5 |
| Example 18 | Effluent from a gold mine in Canada | 25.0 ml | 3.6 ml | 8.9 |
| Example 19 | Effluent generated from ore obtained from a mine in Alaska | 30.0 ml | 0.0 ml | 9.97 |
| Example 20 | Effluent generated from ore obtained from a mine in Alaska | 8.74 ml | 1.26 ml | 8.22 |

Examples 17 and 18 describe tests that were performed on an effluent sample received from a Canadian mine in B.C. with an initial concentration of 409 ppm. Example 17 uses the process of detoxification with $H_2O_2$ alone, while Example 18 uses the present invention employing a mixture of $H_2SO_4$ and $H_2O_2$ in a mole ratio of 1 to 10. The improvement in removal of cyanide according to the present invention is evident from the residual cyanide of 19.5 ppm and 8.9 ppm, respectively.

Examples 19 and 20 describe tests that were performed on an effluent generated from a gold ore obtained from a mine in Alaska, U.S.A. The effluent was a pulp of 50% solids containing 1381 ppm of cyanide. Example 19 shows that 30 ml of 70% $H_2O_2$, with no other reagent, is required to obtain a residual cyanide concentration of 10 ppm. Example 20 describes the detoxification of the same effluent as in Example 19, but using the process described in the present invention. A mixture of 98% $H_2SO_4$ and 70% $H_2O_2$ with a mole ratio of 1 to 10 is used. To obtain the same residual cyanide concentration as in Example 19, only 8.74 ml of 70% $H_2O_2$ and 1.26 ml of 98% $H_2SO_4$ was required. This demonstrates that a substantial saving in reagent alone is possible when a process according to the current invention is employed.

Further variations and modifications of the invention will be apparent to those skilled in the art from the foregoing and are intended to be encompassed by the claims appended hereto.

We claim:

1. A process for treating effluent containing cyanide and other oxidizable substances comprising:
   contacting said effluent with a mixture formed from hydrogen peroxide and sulfuric acid thereby oxidizing the cyanide, wherein the ratio of $H_2SO_4 : H_2O_2$ is between 0.01 and 0.5 moles to 1 mole.

2. The process of claim 1 wherein the ratio of $H_2SO_4: H_2O_2$ is between 0.025 and 0.25 moles to 1 mole.

3. A process in accordance with claim 1, further including the steps of:
   adding alkaline material to the effluent in a quantity sufficient to maintain the pH between 9 and 12.

4. A process in accordance with claim 3, wherein the pH is from 9.5 to 11.5.

5. A process in accordance with claim 1, wherein the cyanide is in the form of a simple or complex cyanide anion.

6. A process for controlling the content of oxidizable cyanide impurity in an aqueous effluent medium to an environmentally acceptable level comprising:
   adding a sufficient amount of hydrogen peroxide and a sufficient amount of sulfuric acid together to form a reaction mixture and allowing the contents of the reaction mixture to contact the aqueous effluent medium having said oxidizable impurity therein within a period of time of no more than 60 minutes after said reaction mixture is formed, wherein the ratio of $H_2SO_4 : H_2O_2$ is between 0.01 and 0.5 moles to 1 mole.

7. The process of claim 6 wherein the ratio of $H_2SO_4 : H_2O_2$ is between 0.025 and 0.25 moles to 1 mole.

8. A process in accordance with claim 6, further including the steps of:
   adding alkaline material to the aqueous medium in a quantity controlled to maintain the pH between 9 and 12.

9. A process in accordance with claim 8, wherein the pH is from 9.5 to 11.5.

10. A process in accordance with claim 6, wherein the oxidizable impurity is cyanide in the form of a simple or complex cyanide anion.

* * * * *